(12) United States Patent
Roson et al.

(10) Patent No.: US 7,017,858 B2
(45) Date of Patent: Mar. 28, 2006

(54) TWO-TONE ISOLATOR ASSEMBLY

(75) Inventors: Ivan Roson, Long Beach, CA (US); Luigi Max Maggi, Long Beach, CA (US)

(73) Assignee: Barry Controls Corp., Wilmington, DE (US)

( * ) Notice: Subject to any disclaimer, the term of this patent is extended or adjusted under 35 U.S.C. 154(b) by 99 days.

(21) Appl. No.: 10/608,012

(22) Filed: Jun. 30, 2003

(65) Prior Publication Data

US 2004/0094665 A1    May 20, 2004

Related U.S. Application Data

(60) Provisional application No. 60/392,299, filed on Jul. 1, 2002.

(51) Int. Cl.
*B64D 27/00* (2006.01)
(52) U.S. Cl. ............... 244/54; 248/550; 267/140.11
(58) Field of Classification Search ............... 244/54; 248/550, 554, 557; 181/207; 267/140.11, 267/175, 292, 293, 294, 140, 140.12
See application file for complete search history.

(56) References Cited

U.S. PATENT DOCUMENTS

| | | | | |
|---|---|---|---|---|
| 3,487,888 A | * | 1/1970 | Bennett Jr., et al. | 181/207 |
| 3,490,556 A | * | 1/1970 | Bennett Jr., et al. | 181/207 |
| 4,697,781 A | * | 10/1987 | Hamano et al. | 248/559 |
| 5,687,948 A | * | 11/1997 | Whiteford et al. | 248/635 |
| 5,762,295 A | * | 6/1998 | McGuire et al. | 244/54 |
| 5,810,319 A | * | 9/1998 | von Flotow et al. | 248/550 |
| 5,873,559 A | * | 2/1999 | von Flotow et al. | 248/557 |
| 5,947,457 A | * | 9/1999 | Swanson et al. | 267/140.14 |
| 2002/0008341 A1 | * | 1/2002 | Yamada et al. | 267/140.11 |

* cited by examiner

*Primary Examiner*—Michael J. Carone
*Assistant Examiner*—Gabriel S. Sukman
(74) *Attorney, Agent, or Firm*—Clark & Brody

(57) ABSTRACT

The invention proposes to address the vibration transfer function transmitted by a turbo-fan engine or equivalent to the aircraft structure, with two types of isolators mounted on a unique assembly but with a different physical response to the transfer function, an absorbing one and a resonating one. The difference in nature of such responses induces a non-interaction effect between the two isolators.

The invention concerns more specifically a two-tone isolator assembly adapted to be mounted on an aircraft or equivalent comprising in particular a head, a cabin yoke and a power engine structure having a longitudinal axis crossed by a radial plan. The two-tone isolator assembly comprises, located at the head side of the aircraft, at least one support for, at least, one fluid mount isolator and two dynamic absorbers, and mechanical means to couple said support to the power engine structure and to the cabin yoke. Said assembly is designed to link the fluid mount isolator at once to the power engine structure and to the cabin yoke, whereas the dynamic absorber is only linked to the cabin structure. Furthermore, the dynamic absorbers are supported to move in the radial plan of the power engine structure.

9 Claims, 4 Drawing Sheets

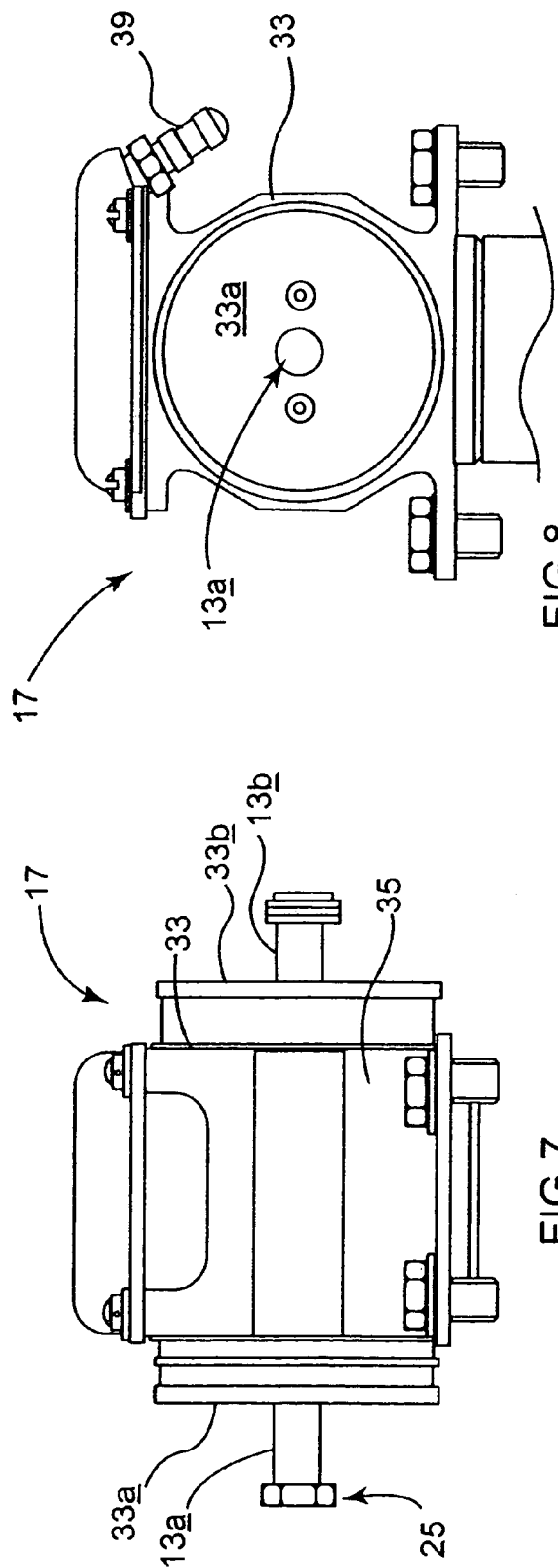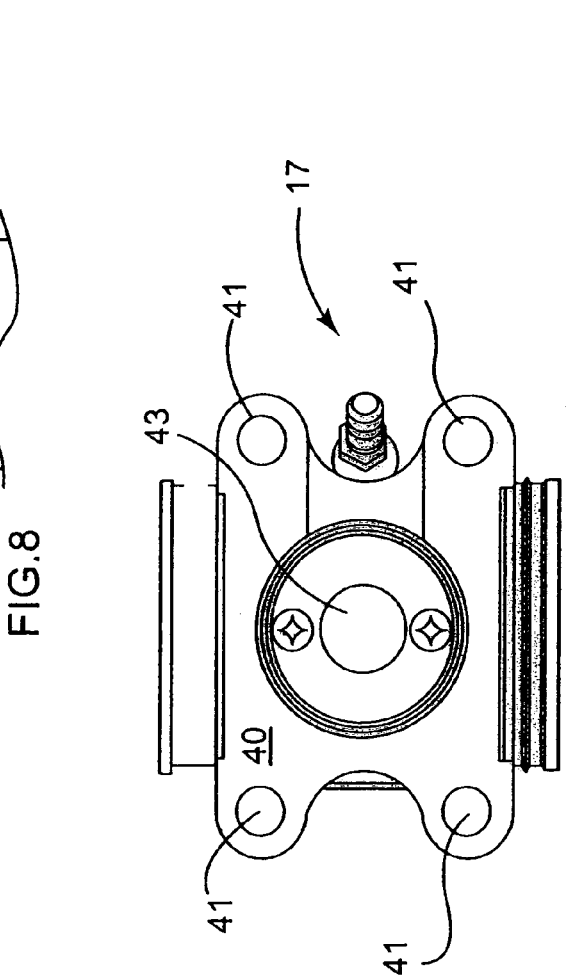

TWO-TONE ISOLATOR ASSEMBLY

This application claims the benefit of Provisional application No. 60/392,299, filed Jul. 1, 2002.

FIELD OF THE INVENTION

The invention relates to a two-tone isolator assembly for a power transmission system. The invention applies more particularly to aircraft powered by turbo-fan engine, i. e. airplanes or helicopters, and is applicable without modification to any structure that vibrates at two major tones, i.e. any automotive vehicle.

Aircraft manufacturers are continuously challenged to produce quieter cabins. A fundamental source of cabin noise is a structural excitement generated by the engine tones disturbing overhead bins and interior panels and inducing pressure fluctuations in the cabin.

It has been experienced that such aircraft engines create essentially two distinct and simultaneous major disturbing tones during cruise tests, as shown by the transmissibility rate plot of FIG. 1. This is a result of the turbo-fan engine structure, which induces in general two-stage imbalances, at low and high pressures. It appears that the first major tone, identified as N1, is a result of the compressor/inlet fan imbalance at low pressure, $N1 \approx 300$ Hz in the reported test. The second major tone, referred as N2 ($\approx 600$ Hz in the example) is the result of the high-pressure compressor/turbine engine spool. The positions of such major tones change with engine power settings.

PRIOR ART

Traditional isolators use passive isolators based on elastomer or composite material, such as metal fabric, to form resilient elements incorporated in the yoke to be isolated. Such isolators are effective but very limited by a maximum allowable static deflection and by inherent material characteristics. The yoke to be isolated does not offer a rigid support for the machinery generating vibration. Furthermore, isolator stiffness increases with increasing frequencies. Consequently, such isolators are not efficient to absorb the vibrations at said two major tones.

Hydraulic isolators are also used to cope with a wide range of vibration frequencies corresponding to different conditions of flight (idle, taxi, take-off, descent, low or high speed cruise, etc.). Such hydraulic mounts, as described for instance in US 2002/0008341 publication, conventionally include at least one incompressible fluid chamber where the fluid is used as an oscillating piston at specific frequencies.

However, the hydraulic isolators present drawbacks concerning efficiency combined with a substantially increased dynamic stiffness at a higher range of frequencies, causing an overshoot of stiffness. This overshoot intensifies the higher major tone N2 and almost prevents absorption of vibrations at higher frequencies. Thus, such hydraulic isolators are not adapted, even in combination, to absorb said two major disturbing tones.

OBJECT OF THE INVENTION

It is therefore an object of the present invention to provide an isolator mount that is able to absorb said two major disturbing tones simultaneously transmitted.

SUMMARY OF THE INVENTION

For that purpose, the invention proposes to address the vibration transmitted by a turbo-fan engine or equivalent to the aircraft structure, with two types of devices mounted on a unique assembly but with a different physical response to the transfer function, an absorbing one and a resonating one. The difference in nature of such responses induces a non-interaction effect between the two isolators.

The invention concerns more specifically a two-tone isolator assembly adapted to be mounted on an aircraft or equivalent comprising in particular a head, a cabin, a yoke connected to the cabin and a power engine structure having a longitudinal axis crossed by a radial plan. The two-tone isolator assembly comprises, located at the head side of the aircraft, at least one support for, at least, one fluid mount isolator and two dynamic absorbers, and mechanical means to couple said support to the power engine structure and to the cabin yoke. Said assembly is designed to link the fluid mount isolator at once to the power engine structure and to the cabin yoke, whereas the dynamic absorber is only linked to the cabin structure. Furthermore, the dynamic absorbers are supported to move in the radial plan of the power engine structure.

The tuning to specific major tones is advantageously achieved by adjusting the dynamic absorber compression and the stiffness of the fluid mount isolators. Preferably, but not necessarily since the contrary is possible, the fluid isolators are more specifically directed to tune the lower major tone whereas the dynamic absorbers more specifically directed to tune the upper major tone.

The isolator assembly can be one that comprises at least one support coupled to the cabin yoke, that comprises one basic combination of a couple of dynamic absorbers sandwiching a central fluid mount linked to the power engine structure. The fluid mount housing has preferably transversal shafts to mount the dynamic absorbers.

The isolator assembly can be one that comprises at least one support coupled to the cabin yoke, which comprises two transversal basic combinations.

The isolator assembly can be one that comprises dynamic absorbers consisting of hybrid compounds of metallic alloy and resilient material, i.e. rubber or elastomeric material. Advantageously, the metallic alloy is composed of a carbon-tungsten steel.

Preferably, either the metallic alloy is bonded to a resilient washer, in particular as a ring surrounding the resilient washer, or the resilient washer is sandwiched between two metallic washers. In that case, the absorber is tuned by compressing the resilient washers.

BRIEF DESCRIPTION OF THE DRAWINGS

FIGS. 7, 8 and 9 are respectively a cross section, a side and a beneath view of a fluid mount isolator of the isolator assembly according to FIG. 1.

DETAILED DESCRIPTION OF THE PREFERRED EMBODIMENT

Figure 2:
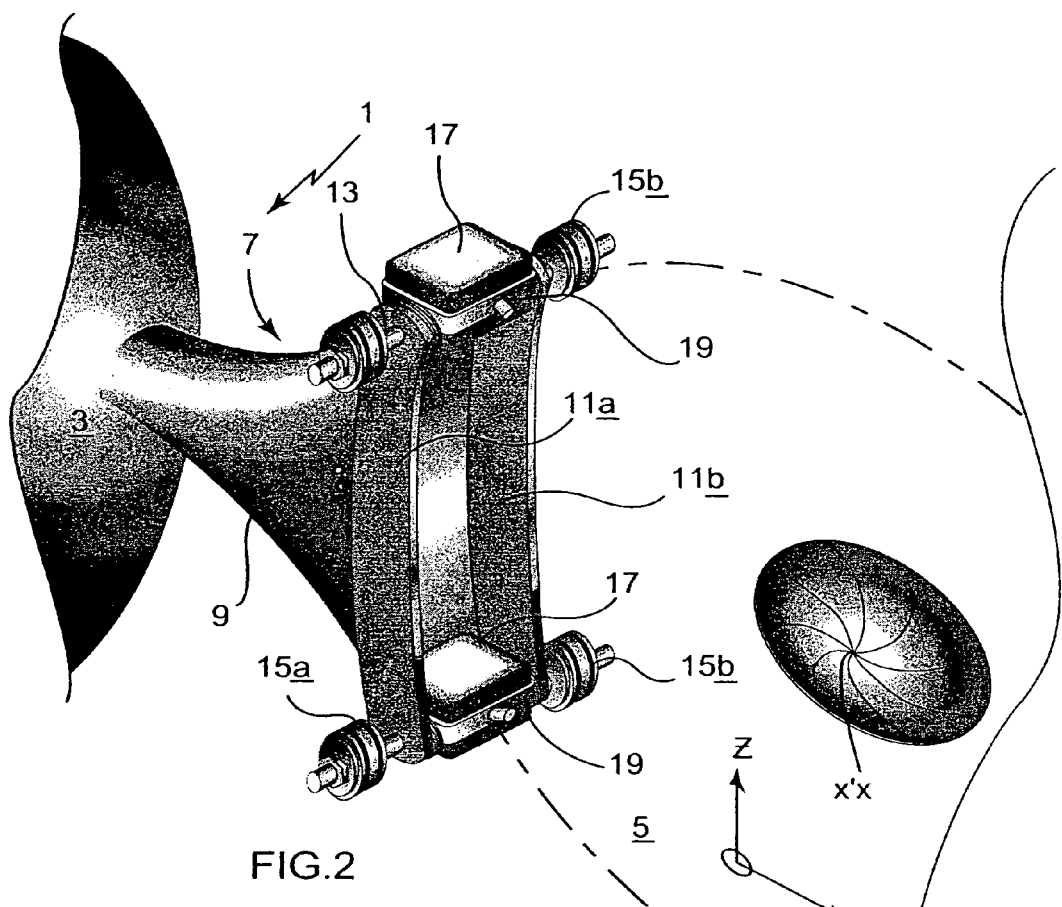
FIG. 2 is a schematic perspective view of an isolator assembly according to the invention, mounted between a cabin yoke and an engine structure.

As shown by FIG. 2, an isolator assembly 1 according to the present invention is mounted between a cabin yoke 3 and an engine structure 5 of an aircraft.

The assembly 1 is mounted at the head side of the aircraft, and comprises one support 7 bolted to the cabin yoke 3 by means of a linking member 9. The linking member 9 is integral to the support.

The support 7 has two parallel sidewalls 11a, 11b, connected by two transversal shafts 13. Each shaft is situated at an end of the sidewalls and carries a basic combination of a couple of dynamic absorbers 15a, 15b, sandwiching a central fluid mounts 17 linked to the power engine structure 5.

The power engine structure 5 has a longitudinal axis X'X crossed by a radial plane YOZ and the support 7 is oriented in such a way that the dynamic absorbers 15a, 15b, are induced to move in the radial plane YOZ of the power engine structure 5.

The support 7 is coupled to the power engine structure by means of two linking forks 19. Thus each fluid mount isolator 17 is linked at once to the power engine structure 5, via the fork 19, and to the cabin yoke 3 via the support 7 and the linking member 9. The dynamic absorbers 15a, 15b, are only linked to the cabin structure 3 via the support 7 and the linking member 9.

Figure 3:
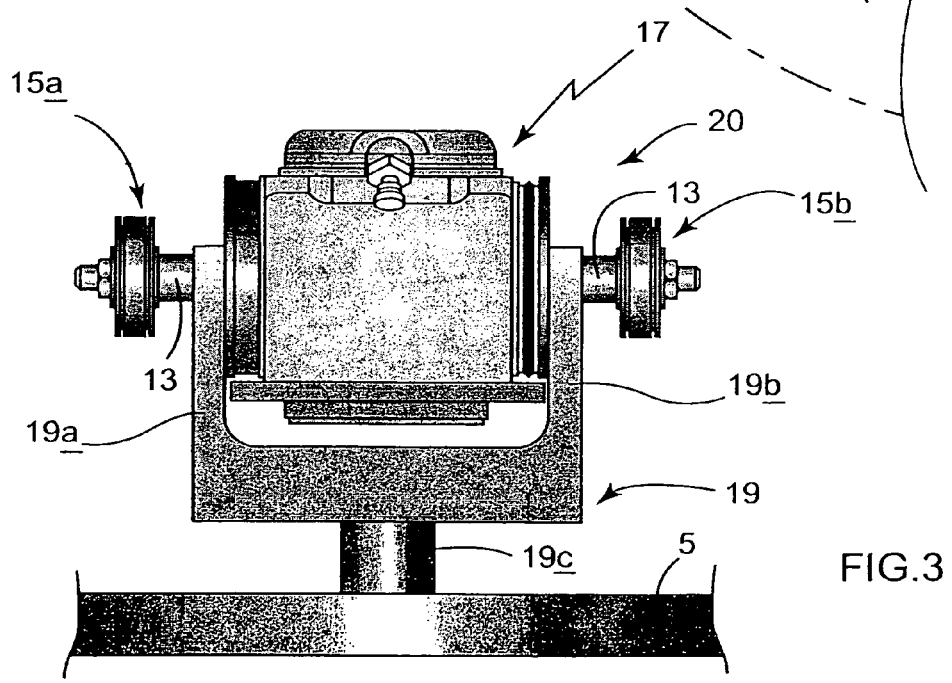
FIG. 3 is a front view of a basic combination of a couple of dynamic absorbers sandwiching a central fluid mount on a shaft.

FIG. 3 shows more particularly a basic combination 20 of a couple of dynamic absorbers 15a, 15b, sandwiching a central fluid mounts isolator 17.

The basic combination 20 supported by the shaft 13 is linked to the power engine structure 5 via the arms 19a, 19b and the stem 19c of each fork 19. The stem is fixed by conventional means. The arms are mounted on the shaft 13 between the central fluid mount 17 and the dynamic absorbers 15a, 15b.

Figure 4:
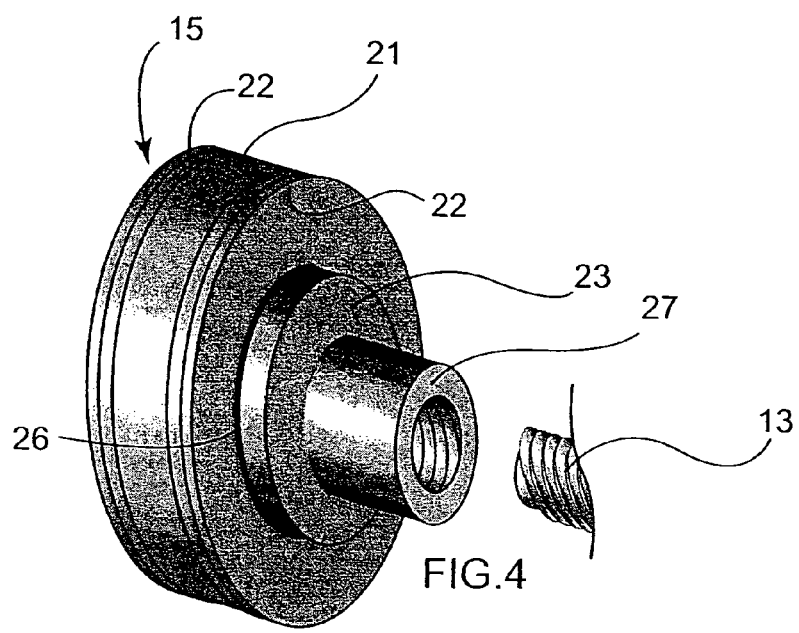
FIGS. 4, 5 and 6 are respectively a perspective, a frontal and a cross section view of a dynamic absorber of the isolator assembly according to FIG. 1.
Figure 5:
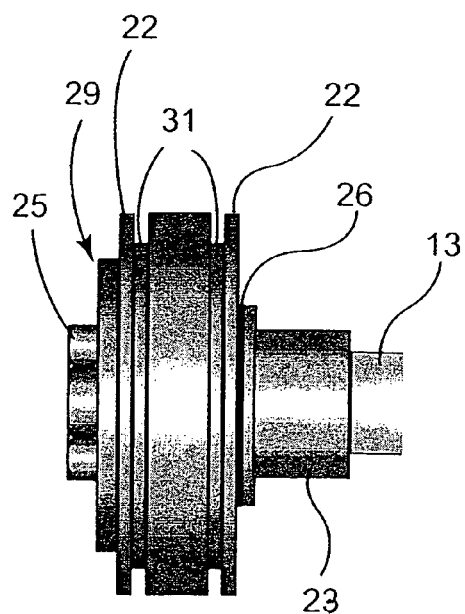
Figure 6:
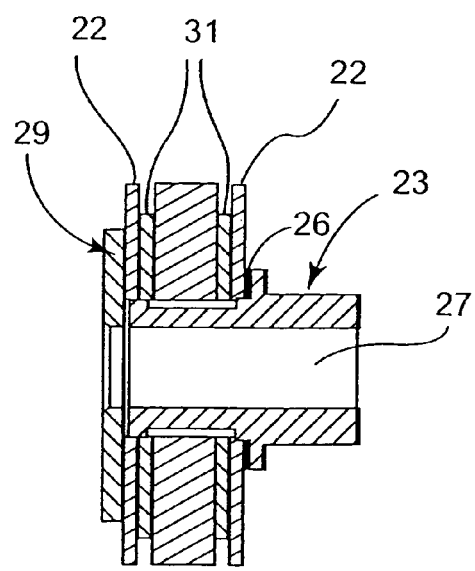

The dynamic absorbers are more detailed in FIGS. 4, 5 and 6, as represented respectively in a perspective, frontal and a cross section view.

Each dynamic absorber 15 is composed of a rubber washer 21 sandwiched between two carbon-tungsten steel washers 22.

The absorber is tuned by adjusting the compression of the rubber washer. The compression is exerted by screwing the shaft 13 to a bolt 25 through a bushing 23. A silicone washer 26 is added to transmit the compression. The bushing presents a central bore 27 to introduce the transversal shaft of the support (FIG. 4). The absorber has also a final plate 29 and two intermediate silicone washers 31.

As for the fluid mounts isolators, they are more detailed in FIGS. 7, 8 and 9, which respectively show a cross section, a side and a beneath view of the same.

Each fluid mounts isolator 17 is composed of: a central housing 33 forming an inner chamber 35 for the fluid actuating as an oscillating piston, an electromagnetic actuator 39 to drive the fluid at a predetermined frequency, a sole 40 and two protruding shafts 13a, 13b, starting from the center of the lateral walls 33a, 33b of the housing 33. Four screws 41 crossing through the sole 40 and a protruding stud 43 are provided to be fixed on the stem 19c of the linking fork 19 (FIG. 3).

The fluid mount isolator is tuned by the pressure of the fluid established in the chamber. The pressure is adjusted before setting the assembly.

Figure 1:
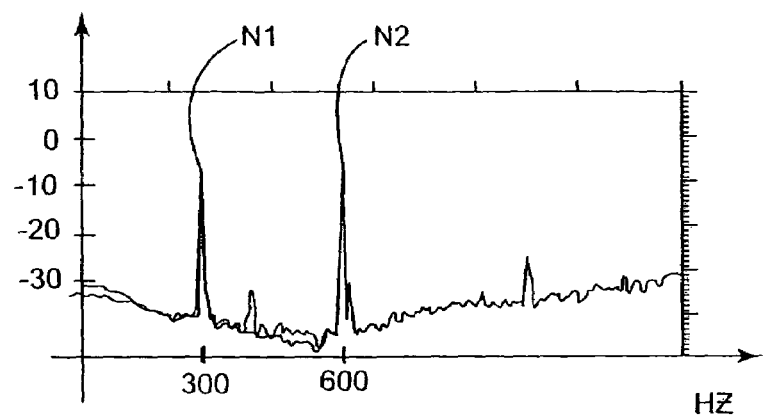
FIG. 1 is a diagram of the two major disturbing tones of an aircraft engine during a cruise test, just commented above.
Figure 10:
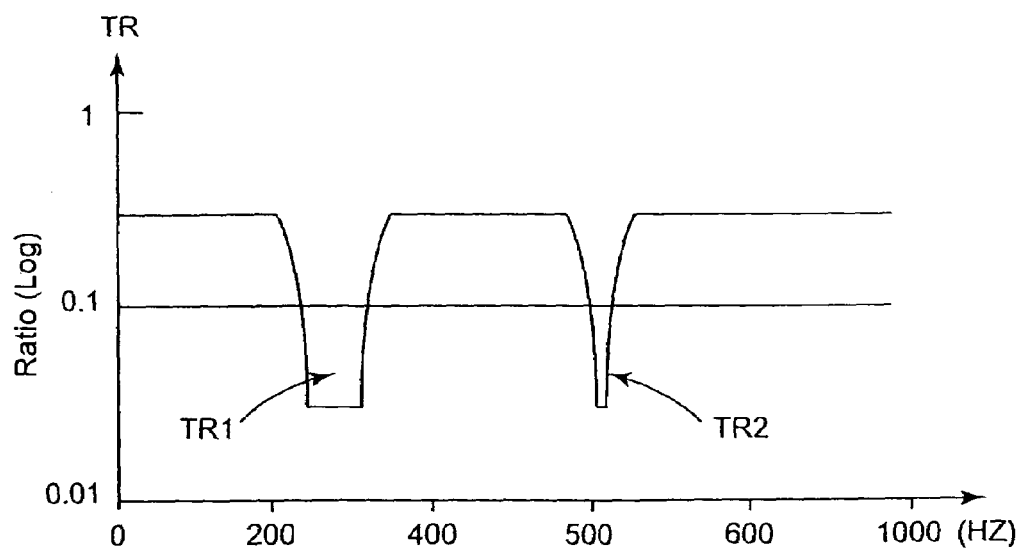
FIG. 10 is a transmission diagram of dynamic stiffness obtained by the isolator assembly according to FIG. 1.

An installed isolator assembly according to the one described above is efficient to absorb two major disturbing tones of a power turbo-fan engine. FIG. 10 illustrates the transmission rate TR of dynamic stiffness in regard of a large frequency range, as obtained by such an isolator assembly. The Figure shows that the assembly is tuned to absorb frequencies around 300 Hz and 600 Hz, as pointed out by the falls TR1 and TR2 of the transmission rate. The falls correspond respectively to the major tones N1 and N2 that have been emphasized in FIG. 1.

The fluid isolators are specifically directed to tune the lower major tone at about 300 Hz whereas the dynamic absorbers are specifically directed to tune the upper tone at 600 Hz. This repartition is preferred since the lower tone should vary and the range of absorption is larger with fluid absorbers than the one of dynamic absorbers.

Although the invention has been described with reference to preferred embodiments, persons skilled in the art will recognize that adaptations should be made in form, equivalency and detail without departing from the spirit and scope of the present invention.

What is claimed is:

1. A two-tone isolator assembly adapted to be mounted on an aircraft or equivalent comprising a head, a cabin, a yoke connected to the cabin and a power engine structure having a longitudinal axis crossed by a radial plan, wherein said two-tone isolator assembly comprises, located at the head side of the aircraft, at least one support for, at least, one fluid mount isolator and two dynamic absorbers, and mechanical means to couple said support to the power engine structure and to the cabin yoke, said assembly being designed to link the fluid mount isolator at once to said power engine structure and to said cabin yoke, whereas the dynamic absorbers are only linked to the cabin structure, and wherein the dynamic absorbers are supported to move in said radial plane of said power engine structure, wherein said isolator assembly comprises at least one support coupled to the cabin yoke, the support comprising one transversal basic combination of a couple of dynamic absorbers sandwiching a central fluid mount linked to said power engine structure, the fluid mount housing having transversal shafts to mount the dynamic absorbers.

2. A two-tone isolator assembly according to claim 1, wherein a tuning to specific major tones is achieved by adjusting compression in the dynamic absorbers and stiffness of the fluid mount isolators, the fluid isolators being specifically directed to tune a lower major tone whereas the dynamic absorbers are specifically directed to tune an upper major tone.

3. A two-tone isolator assembly according to claim 1, wherein said isolator assembly comprises two basic traversal combinations.

4. A two-tone isolator assembly according to claim 1, wherein the dynamic absorbers comprise hybrid compounds of metallic alloy and resilient material.

5. A two-tone isolator assembly according to claim 4, wherein the resilient material is rubber or elastomeric material.

6. A two-tone isolator assembly according to claim 4, wherein the metallic alloy is composed of a carbon-tungsten steel.

7. A two-tone isolator assembly according to claim 4, wherein the metallic alloy is bonded to a resilient washer.

8. A two-tone isolator assembly according to claim 7, wherein the metallic alloy forms a ring surrounding the resilient washer.

9. A two-tone isolator assembly according to claim 4, wherein the resilient washer is sandwiched between two metallic washers to tune the resilient washer by compression.

* * * * *